US011881809B2

(12) United States Patent
Cook

(10) Patent No.: US 11,881,809 B2
(45) Date of Patent: Jan. 23, 2024

(54) ROTATABLE AIRFOIL STRUCTURE WITH INTEGRATED SOLAR PHOTOVOLTAIC ELECTRICITY GENERATION

(71) Applicant: Bradley Cook, Denver, CO (US)

(72) Inventor: Bradley Cook, Denver, CO (US)

( * ) Notice: Subject to any disclaimer, the term of this patent is extended or adjusted under 35 U.S.C. 154(b) by 0 days.

(21) Appl. No.: 17/307,640

(22) Filed: May 4, 2021

(65) Prior Publication Data

US 2021/0351737 A1 Nov. 11, 2021

Related U.S. Application Data

(60) Provisional application No. 63/021,257, filed on May 7, 2020.

(51) Int. Cl.
*H02S 20/32* (2014.01)
*H02S 10/12* (2014.01)
*H02S 30/10* (2014.01)

(52) U.S. Cl.
CPC .............. *H02S 20/32* (2014.12); *H02S 10/12* (2014.12); *H02S 30/10* (2014.12)

(58) Field of Classification Search
CPC ........... H02S 10/12; H02S 40/22; H02S 20/32
See application file for complete search history.

(56) References Cited

U.S. PATENT DOCUMENTS

| | | | | |
|---|---|---|---|---|
| 9,228,370 | B1 * | 1/2016 | Boniface | H02S 10/12 |
| 2009/0038673 | A1 * | 2/2009 | Ware | H02S 40/34 |
| | | | | 136/246 |
| 2010/0183443 | A1 * | 7/2010 | Thorne | H02S 10/12 |
| | | | | 136/244 |
| 2010/0207453 | A1 * | 8/2010 | Ottman | H02S 10/12 |
| | | | | 307/72 |
| 2014/0285005 | A1 * | 9/2014 | Casteel | H02S 10/40 |
| | | | | 320/101 |
| 2015/0251755 | A1 * | 9/2015 | Schaefer | H02K 7/1853 |
| | | | | 290/55 |
| 2017/0019063 | A1 * | 1/2017 | Zoller | G01R 19/16528 |
| 2017/0336104 | A1 * | 11/2017 | Tenghoff | E04F 10/00 |
| 2019/0352024 | A1 * | 11/2019 | Todter | H01L 31/043 |
| 2021/0246869 | A1 * | 8/2021 | Suzuki | F03D 3/005 |

OTHER PUBLICATIONS

Merriam-Webster definition "airfoil".*

* cited by examiner

*Primary Examiner* — Bethany L Martin
(74) *Attorney, Agent, or Firm* — Kenyon Jenckes

(57) ABSTRACT

A rotatable solar tower with an airfoil structure is described. Solar panels are stacked vertically to create the skin of an airfoil. By installing the airfoil vertically so that its longitudinal axis is perpendicular to the ground and allowing the airfoil to rotate freely 360 degrees into the wind, the horizontal forces on the airfoil from the wind are significantly reduced compared to a round cylinder with the same diameter. This allows the airfoil structure to be lightweight in design while spanning several hundred feet in height and producing several hundred kilowatts of electrical power on a small footprint of land. The solar panels may have 3-axes of rotation, i.e., rotation of the tower about the base, horizontal extension of the solar frame assemblies and vertical extension of the solar panels. Wind turbines may also be provided in or on the tower.

17 Claims, 18 Drawing Sheets

ROTATABLE AIRFOIL STRUCTURE WITH INTEGRATED SOLAR PHOTOVOLTAIC ELECTRICITY GENERATION

CROSS-REFERENCE TO RELATED APPLICATIONS

This application claims priority to U.S. Provisional Patent Application Ser. No. 63/021,257, filed May 7, 2020, and entitled "ROTATABLE AIRFOIL STRUCTURE WITH INTEGRATED SOLAR PHOTOVOLTAIC ELECTRICITY GENERATION", the "Provisional Application", and incorporates the entire contents of the Provisional Application herein.

TECHNICAL FIELD

The present disclosure describes a solar tower, and more specifically a solar tower employing an integrated airfoil structure with 3-axes of solar panel rotation

BACKGROUND

Many solar installations have limited space to install the required number of panels for their solar project, have less than desirable solar angles based on latitude or poor azimuth and slope of a roof, contend with snow and ice covering panels during winter months and/or are located in high wind regions requiring heavy mounts to protect the panels from blowing away. These factors can limit the solar power output of a system or make installations too costly and potentially unfeasible.

Solar panels installed on the roofs of houses have a fixed angle and orientation, and a limited square foot area on how many panels can be installed. Roof-installed solar panels are also susceptible to damage due to high winds, hail, or ice and snow coverage during winter months in northern climates.

Solar fields require the purchase or lease of large plots of land with added expenses such as running power lines to the nearest utility grid. Current solar tower designs are fixed in place creating a large wind area that requires a much heavier and more expensive support structure and loose solar efficiency with only a single axis of rotation.

As stated above, many solar installations have limited space to install the required number of panels for their solar project, have less than desirable solar angles based on latitude or a poor azimuth and slope of a roof, and contend with snow and ice covering panels during winter months. Furthermore, such solar panel constructions located in high wind regions may require heavy mounts to protect the panels from blowing away. These factors can limit the solar power output of a system or make installations too costly and potentially unfeasible.

Accordingly, it would be advantageous to provide a solar installation that mitigates many or all of these problems.

SUMMARY

In an embodiment, a solar tower installation uses solar panels as the skin of an airfoil while taking advantage of the rigidity of solar frames to strengthen the structure as a whole. The solar panels are attached to a shell which acts as the nose of the airfoil. The solar panels may be incorporated into individual solar frames. The solar frames may be connected vertically to form solar frame assemblies and include actuators to tilt the solar panels to capture more solar energy. The solar frame assemblies may be in an extended position, e.g., horizontally 90 degrees from the shell (nose) to capture more solar energy or in a closed position, to act as an airfoil.

Thus the solar panels may have 3-axes of rotation, i.e., 360 degree rotation of the tower about the base, horizontal extension of the solar frame assemblies from the closed airfoil position, to the fully extended position, and extension of the solar frames vertically from a closed, airfoil position to an extended position.

Should the winds exceed, for example, a certain threshold as determined by an internal weather sensor system or load sensors connected to the actuators, a control system may control the solar frames and solar frame assemblies to fold down and inwards, respectively, into an efficient airfoil structure while also controlling a base clutch to disengage the motor from a spur gear allowing free rotation of the tower. When the wind drops below another threshold, the clutch may reengage the motor to the spur gear and continue to track the sun and the new sun orientation for maximum power generation.

In an embodiment, the tower may include a wind turbine assembly with a second bearing. The wind turbine assembly may rotate with or independently from the airfoil and include internal brakes to stop and start based on weather conditions and power requirements. In most cases, the wind turbine will complement the solar panels, adding a more reliable energy stream for off-grid applications.

DETAILED DESCRIPTION

Figure 1:
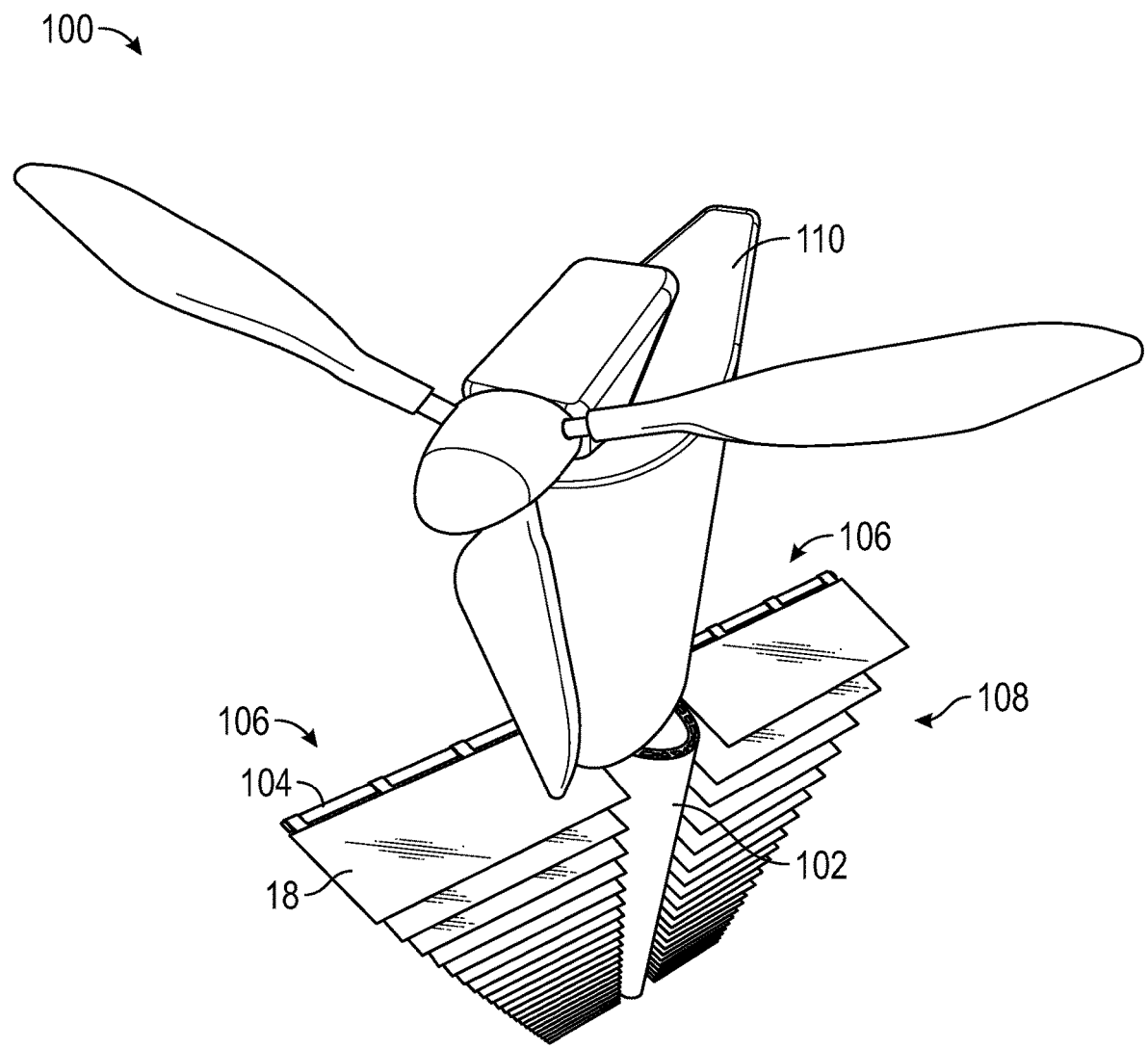
FIG. 1 is a perspective view of a solar tower installation including a wind turbine assembly according to an embodiment.

FIG. 1 shows an embodiment of a solar tower installation 100 that uses solar panels 18 as the skin of an airfoil 108 while taking advantage of the rigidity of each solar panel to strengthen the structure as a whole similar to sheets of plywood screwed to the trusses of a home. The solar panels 18 are attached to a shell 102 which acts as the nose of the airfoil. The solar panels 18 may be incorporated into individual solar frames 104. The solar frames may be connected vertically to form solar frame assemblies 106. The solar frame assemblies 106 may be in an extended position, e.g., horizontally 90 degrees from the shell (nose) 102, as shown in FIG. 1, to capture more solar energy, or in a closed position, as shown in FIG. 2, to act as an airfoil.

Figure 2:
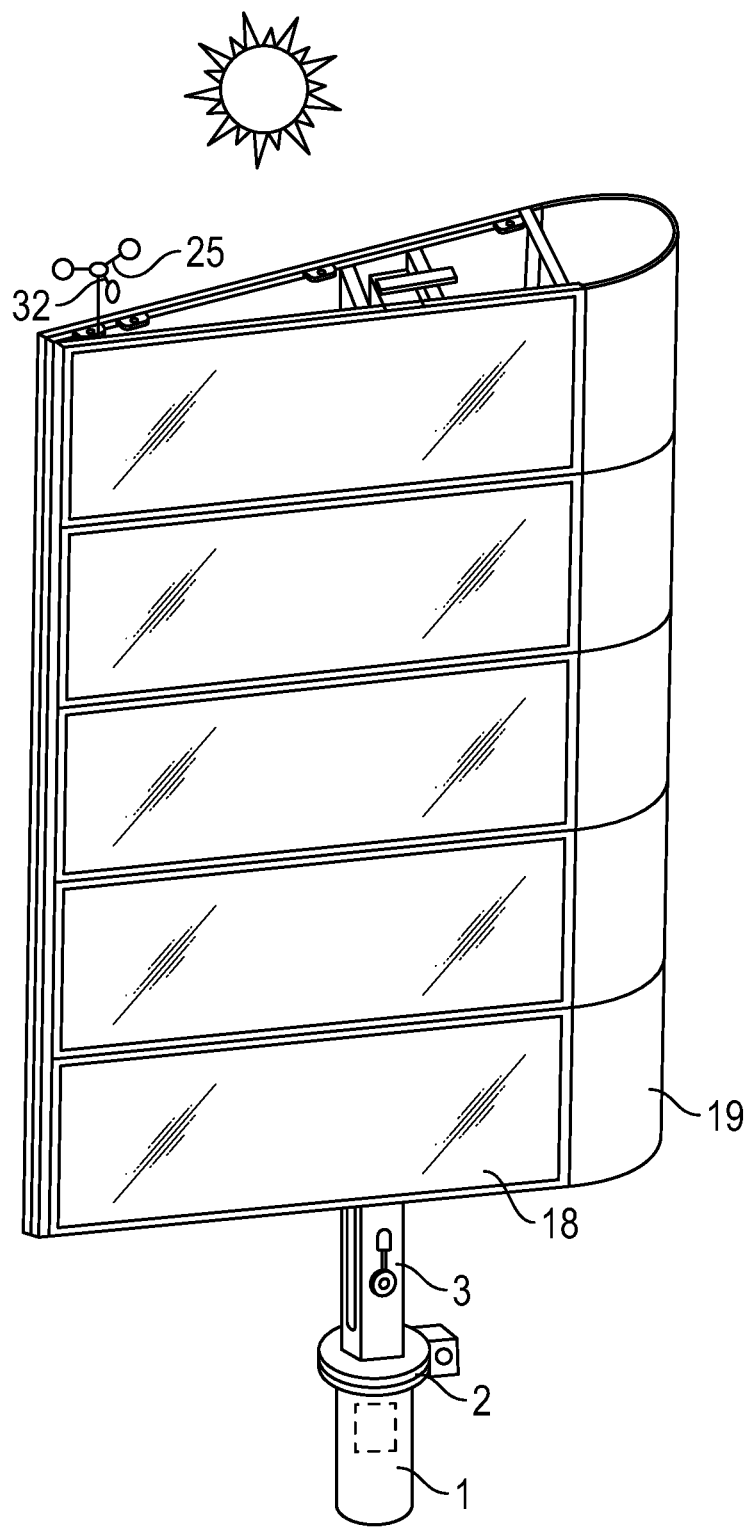
FIG. 2 is a perspective view of a solar tower installation according to another embodiment.

Thus the solar panels may have 3-axes of rotation, i.e., 360 degree rotation of the tower 100 about the base, horizontal extension of the solar frame assemblies 106 from the closed airfoil position, as shown in FIG. 2, to the fully extended position, as shown in FIG. 1, and extension of the solar frames 104 vertically from a closed, airfoil position, as shown in FIG. 2, to an extended position, as shown in FIG. 1.

Should the winds exceed, for example, 30 mph, the solar frames 104 and solar frame assemblies 106 fold down and inwards, respectively, into an efficient airfoil structure while a base clutch disengages the motor from a spur gear allowing free rotation of the tower, which in an embodiment, may be rated for a 200 mph survival wind speed. When the wind drops below, for example, 10 mph for 10 minutes with an improving weather forecast, the clutch may reengage the motor to the spur gear and continue to track the sun and the new sun orientation for maximum power generation.

In an embodiment, the tower 100 may include a wind turbine assembly 110 with a second bearing installed just above the top solar frame to allow the airfoil to act as a tail keeping the wind turbine into the wind. The wind turbine could include, for example, a 5 kw or 10 kw varying pitch control wind turbine. The wind turbine assembly may rotate with or independently from the airfoil and include internal brakes to stop and start the rotation of the wind turbine blades based on weather conditions and power requirements. In most cases, the wind turbine will complement the solar panels, adding a more reliable energy stream for off-grid applications.

Using solar panels as the skin of an airfoil allows the airfoil structure to maintain the smooth uninterrupted flow of air over the contour of the wing and allows the airfoil structure to freely rotate 360 degrees into the wind, significantly reducing the structures drag coefficient. This allows the structure to be much lighter in construction, taller in height offering increased photovoltaic electricity generation capacity in a smaller footprint of land while reducing material and installation costs.

In an embodiment, the tower 100 may be extended up to 200 feet in height, depending on the size and number of solar panels, and withstand winds up to 200 mph. Solar, wind, cellular, electric vehicle (EV) equipment racking, inverters, lithium (Li) power packs, hydrogen generators, hydrogen storage tanks and hydrogen fuel cells may be integrated seamlessly into the tower based on the intended use. The electrical power provided by the tower may be used for a variety of applications, including residential, cellular, commercial, utilities, EV stations, and off-grid applications.

Previous solar towers or pedestals are fixed in place, requiring a much heavier and more costly support structure and foundation to handle the increased wind loading on panels oriented towards the sun. Having fixed solar panels on a rooftop or tower installation will significantly reduce the power output of each solar panel throughout the year, requiring more panels to be installed increasing costs. Solar panel pedestal mounts that can rotate with the direction of the sun are limited to a fixed number of panels each pedestal can support, require a larger footprint of land with increased installation and maintenance costs. Fixed solar towers are also limited on the number of panels they can support without an expensive foundation and support structure.

By installing the airfoil vertically so that its longitudinal axis is perpendicular to the ground and allowing the airfoil to rotate freely 360 degrees into the wind, the horizontal forces on the airfoil from the wind are significantly reduced by up to five times that of a round cylinder with the same diameter or 20 twenty times that of a flat surface area with the same width. This allows the airfoil structure to be designed several hundred feet in height, producing several hundred kilowatts of electrical power on a small footprint of land. For example, the vertical footprint may use less than 10% of land space over fixed solar arrays reducing land costs while providing more solar tower installation location options.

By incorporating solar panels within the airfoil structure and providing 3-axes of rotation (rotation of the tower about the base, opening outwards horizontally and tilting from 0 degrees vertically to 90 degrees horizontally), the power output of each solar panel is significantly increased over conventional solar installs with a more linear power output throughout the year. With full 3-axis, computer controlled solar tracking (described below), solar output may increase up to 80% over fixed solar with optimal panel azimuth and orientations throughout the day.

Stacking solar panels vertically will create some shading from one solar panel onto the next when extended (FIG. 1) during the midday sun. However, with longer days, the solar panels have more time to make up for the shading by tracking the sun from early morning through the evening. Shading will vary based on the latitude and longitude of the installation, time of day and time of year. For example, in summer months, the sun is much higher in the sky, and there is an average of 50% shading between 10 am and 2 pm, but the solar panels create power during midmorning and late afternoon sun offsetting this power loss. In winter months, the sun is a lot lower in the sky requiring the solar panels to be more vertical, avoiding shading from one solar panel to the next. Snow accumulation and dust is also minimized and/or avoided with solar panels in this configuration.

In an embodiment shown in FIG. 2, a support pedestal 1 is secured to a concrete foundation 20 (FIG. 5) with a tilt-up base flange 22. A bearing 2 is attached between the support pedestal 1 and the vertical support tube 3. As shown in FIG.

5, multiple support tubes 3 can be attached together with splice plates 24. An anemometer 25 may be mounted to the top of the airfoil with a compass 32 to control the azimuth adjustment motor 9.

Figure 3:
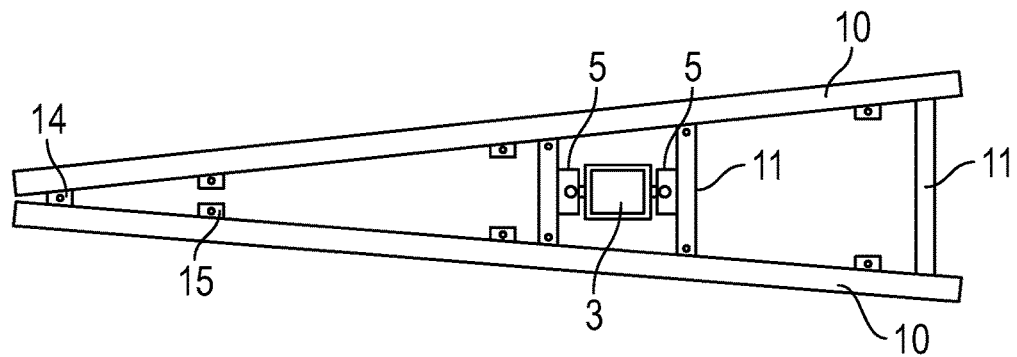
FIG. 3 is a plan view of a support frame assembly for the solar frame assemblies according to an embodiment.
Figure 4:
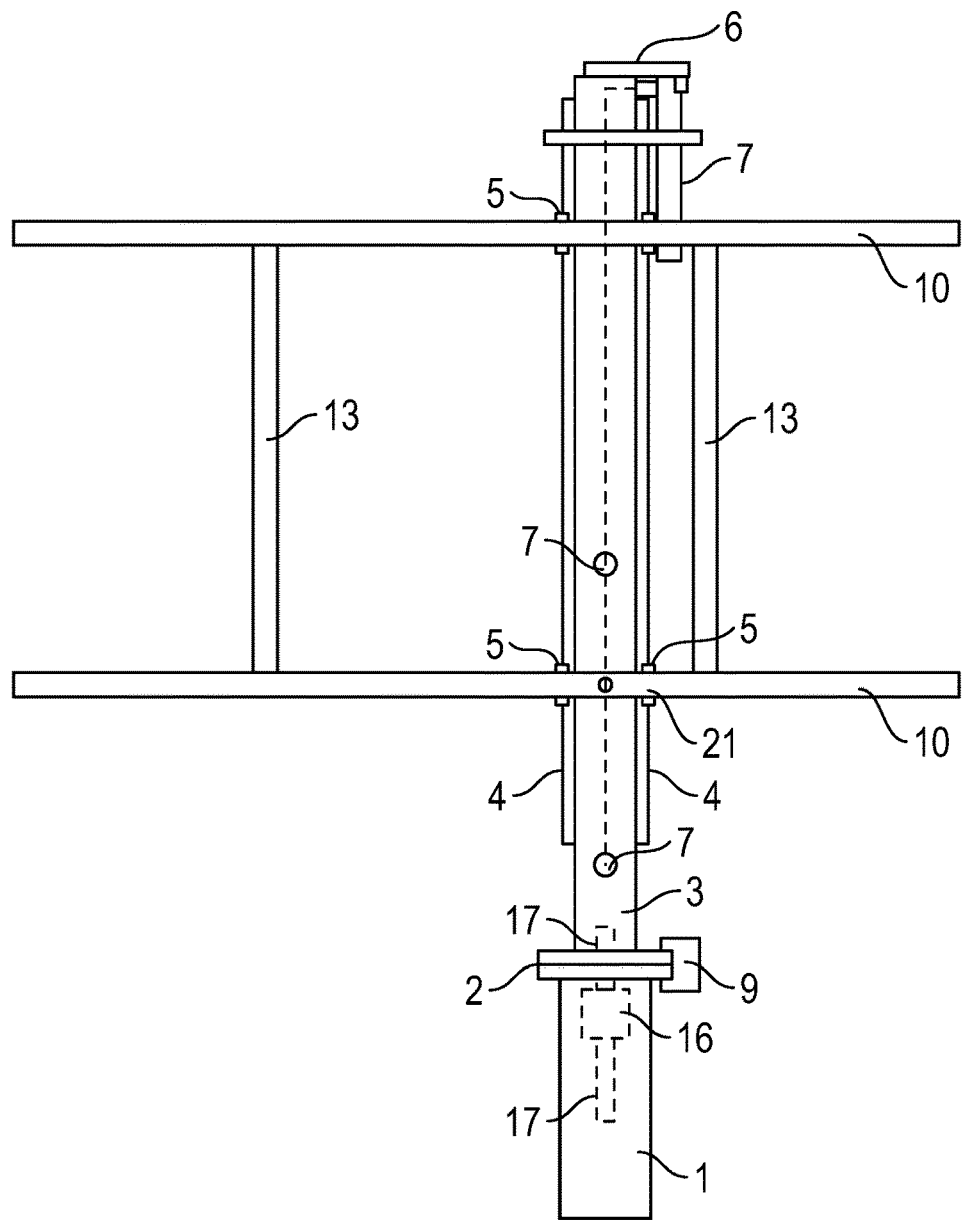
FIG. 4 is a side view of a partially assembled solar frame according to an embodiment.

As shown in FIG. 3, channels 10 may be connected together with vertical support braces 13 (FIG. 4) to create a single frame 104. A pinned flange connection 14 and inner support braces 11 may be used to connect individual frames together to create a solar frame assembly 106. Linear motion guide blocks 5 may be attached between inner support braces 11 and the linear motion guide rails 4.

Figure 5:
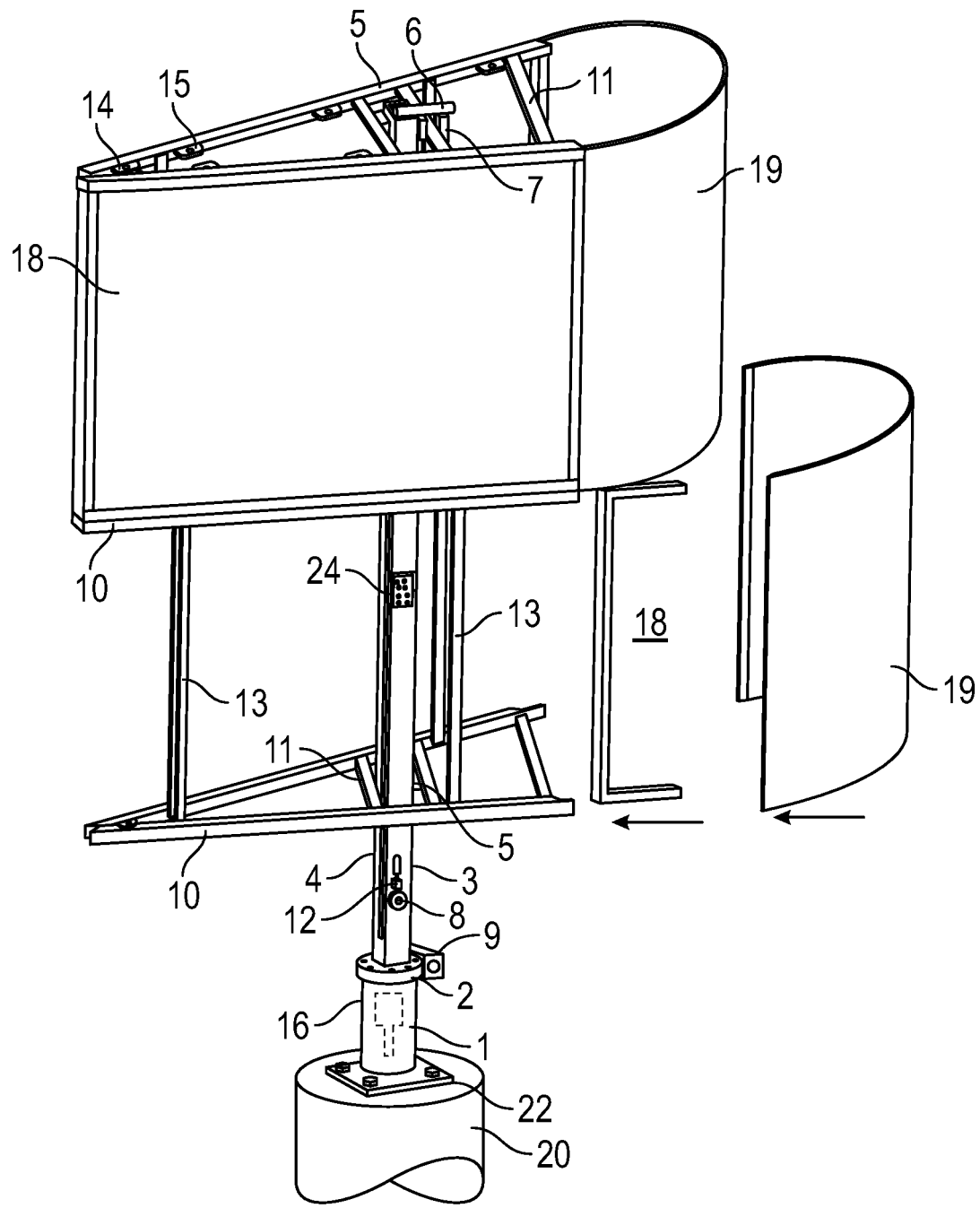
FIG. 5 shows an assembly of sections of the solar tower installation according to an embodiment.

As shown in FIG. 5, solar panels 18 may be slid into the channels 10 and a front cover 19 attached to the solar frame. A load line 7 (FIG. 4) may be attached to the inner support brace 11, the topping lift 6, through the jam cleat 12 and to the winch 8 to lift the solar frames 104 vertically up the support tube 3.

Additional solar frames with solar panels 18, front covers 19 and linear motion guide blocks 5 may be connected to each other with connection flanges 15 and to the linear motion guide rails 4. A number of the solar frames 104 may be attached vertically to form two solar frame assemblies 106, one connected to each end of the nose 102 to form the airfoil 108.

A base pin 21 is used to hold all the solar frames vertically in place. Electrical wire 17 (FIG. 4) is connected to each solar panel 18 either in parallel or series and installed down through the vertical support tube 3 to a slip ring 16 and to an external solar inverter. A slip ring 16 is an electromechanical device that allows the transmission of power and electrical signals from the rotating airfoil structure to the stationary support pedestal.

Programmable LED lights (not shown) may be installed up the inside of the airfoil along the trailing edge and programmed to show the current power production or overall power produced at the end of each day.

A tilt-up base flange 22 allows the mast components to be installed at ground elevation. To assemble the solar tower installation 100, the bearing 2, support tube(s) 3, splice plates 24, linear motion guide rails 4, topping lift 6, load line 7 and slip ring 16 are all assembled together and then raised and secured in their vertical position on the support pedestal 1. In this case, the first solar frame 18 with internal bracing is assembled around the base of the vertical support tube 3. Linear motion guide blocks 5 are attached to the inner bracing 11 and linear motion guide rails 4 allowing the solar frame to move freely up and down the vertical support tube 3. The load line 7 is attached to the inner bracing 11 to hold the solar frame assembly in place while solar panels are inserted and fixed to the guide channels on each face of the solar frame assembly and a front cover installed, creating the airfoil skin.

The solar frame is raised vertically with the load line 7 by winch and a second solar frame is installed around the vertical support tube 3 and connected to the bottom of the first solar frame 104. A second set of linear motion guide blocks 5 are attached between the inner bracing 11 and linear motion guide rails 4, a second set of solar panels installed and wired together and a second front cover installed. Additional solar frames 104 are installed using the same method until the desired structure height and solar power output is achieved.

The bearing 2 allows the airfoil structure to spin freely into the wind while the support pedestal 1 remains fixed in place. A motor on the slewing bearing with the anemometer 25 and compass 22 are able to further assist in solar power generation by rotating the airfoil with the sun during periods of light wind conditions.

The support pedestal 1, vertical support tubes 3, and solar frame 104 can all be made out of lightweight materials such as aluminum or fiberglass for ease of shipping and handling and installation. The vertical support tube 3 can be made in predefined lengths and spliced together matching a set quantity of solar frames per section. Example: a 50 ft. airfoil structure could have a 3 ft. base pedestal, a 7 ft. vertical support tube and 4 (four) 10 ft. vertical support tubes with 3 solar frames per section for a total of 12 (twelve) solar frames stacked vertically.

The solar frame 104 can accommodate multiple standard "rigid" solar panels 18 such as those used for residential or commercial applications or custom designed flexible solar panels creating the skin of the airfoil. In an embodiment, SunPower 5th generation solar panels may be used. The solar panels are made of shingles, increasing solar efficiency and output per square foot with a 3×6 electrical grid pattern offering high performance during shading ($1/18$th shade increments). The solar panels may be, for example, 450 w, 535 w and 625 w in size and can be installed horizontally or vertically to the solar frames based on system design. However, the solar frames 104 may be designed to accommodate any solar panel.

The chord length of the airfoil should be a minimum of 4 times its' diameter to achieve a drag coefficient (Cf) less than 0.25. Example: a front diameter of 2 ft. will require a minimum chord length of 8 ft, providing a surface area of approximately 6 ft. for solar panels on each of the two faces of the airfoil.

The front cover of the airfoil can be made of any lightweight material such as rolled or bent aluminum, fiberglass or flexible solar panels with sufficient strength to maintain its airfoil shape in strong wind conditions.

In an embodiment, with the use of a crane, the entire airfoil structure with solar panels can be assembled on the ground and lifted into place, eliminating the need for a tilt-up base flange 22, vertical support tube 3, linear motion guide rails 4, linear motion guide blocks 5, topping lift 6 and load line 7.

Figure 6:
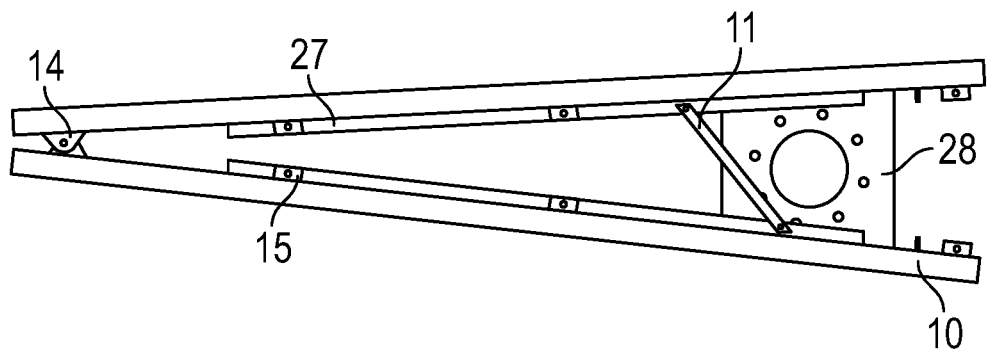
FIG. 6 is a plan view of a support frame assembly for the solar frame assemblies according to another embodiment.
Figure 7:
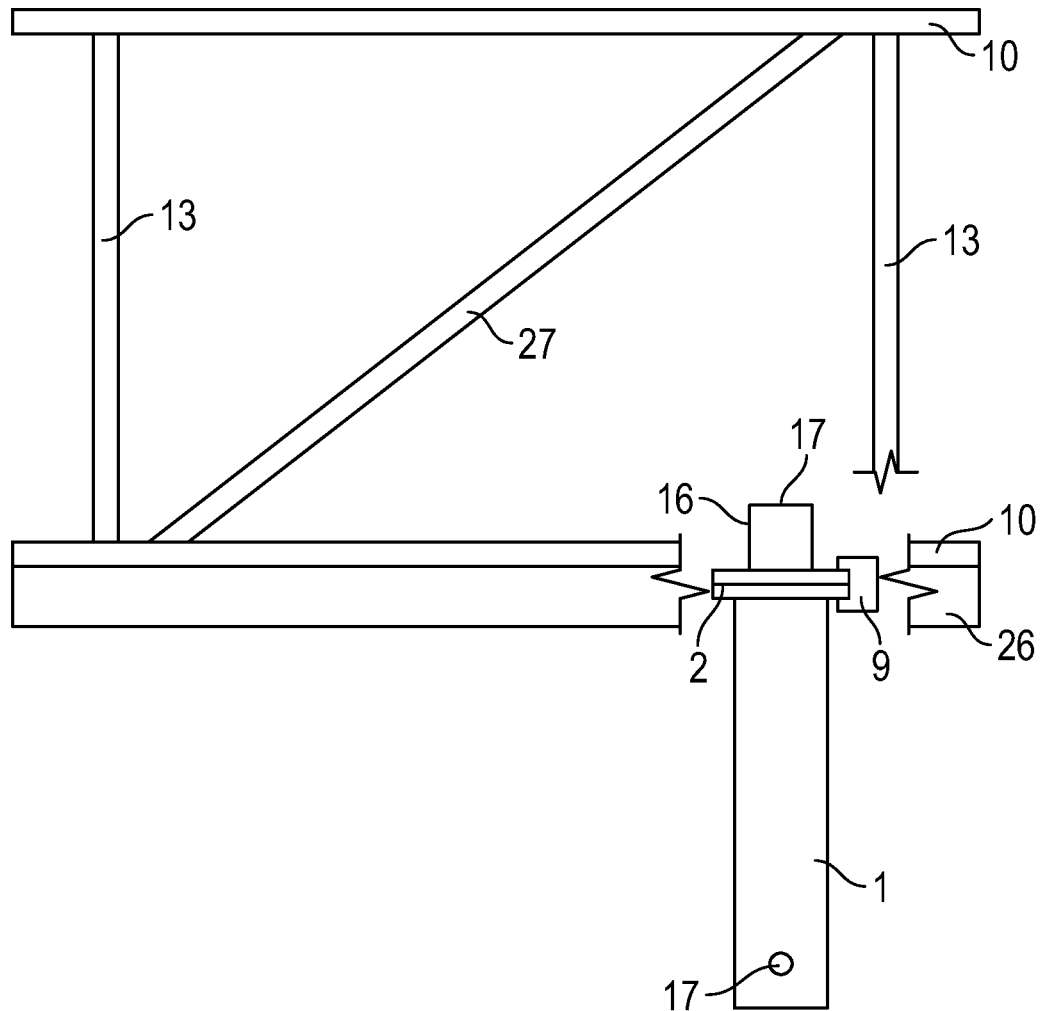
FIG. 7 is a side view of a partially assembled solar frame according to another embodiment.
Figure 8:
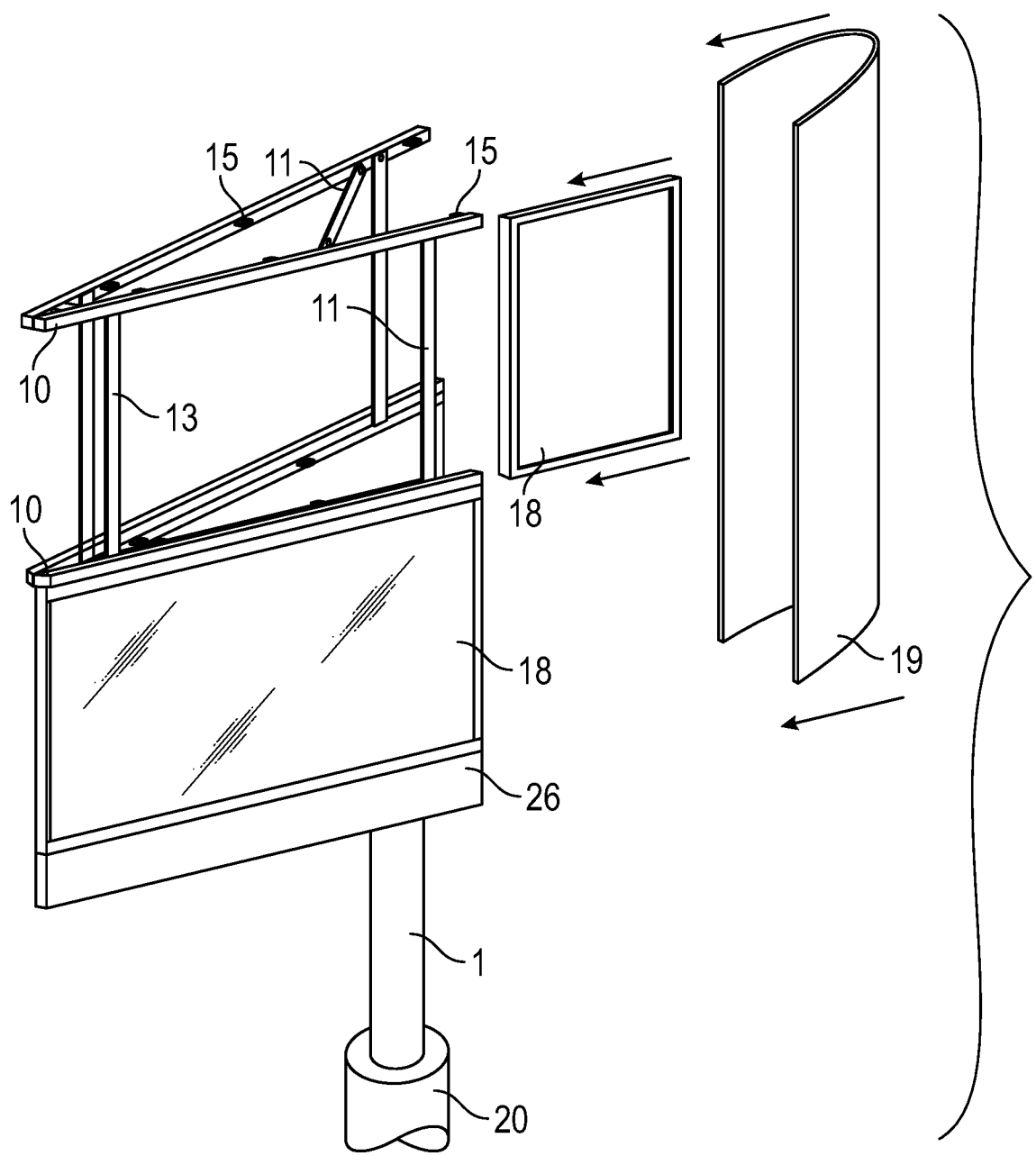
FIG. 8 shows an assembly of sections of the solar tower installation according to another embodiment.

A base support plate 28 and base support frame 26 as outlined in FIGS. 6 to 8 would need to be added to transfer the axial and overturning moments of the airfoil structure through the bearing to the support pedestal 1. As shown in FIG. 6, the base support plate 28 includes a hole to accommodate a spline. In an embodiment, the spline has a 4.5" OD (outer diameter), which may be fixed against rotation, and may be provided for electrical runs and supporting antennas, racks and batteries. The user may open the shell to climb up the inside and install equipment on the fixed spline.

As shown in FIGS. 6 and 7, a diagonal support 27 may be included with the horizontal channels 10 and vertical support braces 13 to create the frame. FIG. 8 shows the assembly of the solar frames 104, with the solar panel 18 slid into the frame, and the front cover 19 to a number of the solar frames.

Figure 9:
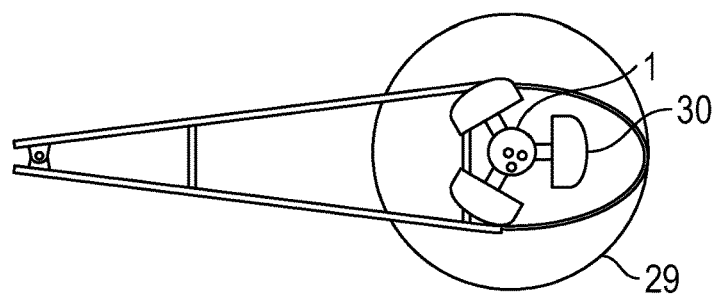
FIG. 9 is a plan view of an airfoil structure in the solar tower installation including cellular panels according to an embodiment.

A fixed pedestal 1 spanning the entire height of the airfoil structure would allow cellular panels 30 to be installed within the airfoil or above the airfoil in an RF transparent fiberglass shroud 29 as shown in FIG. 9.

Figure 10:
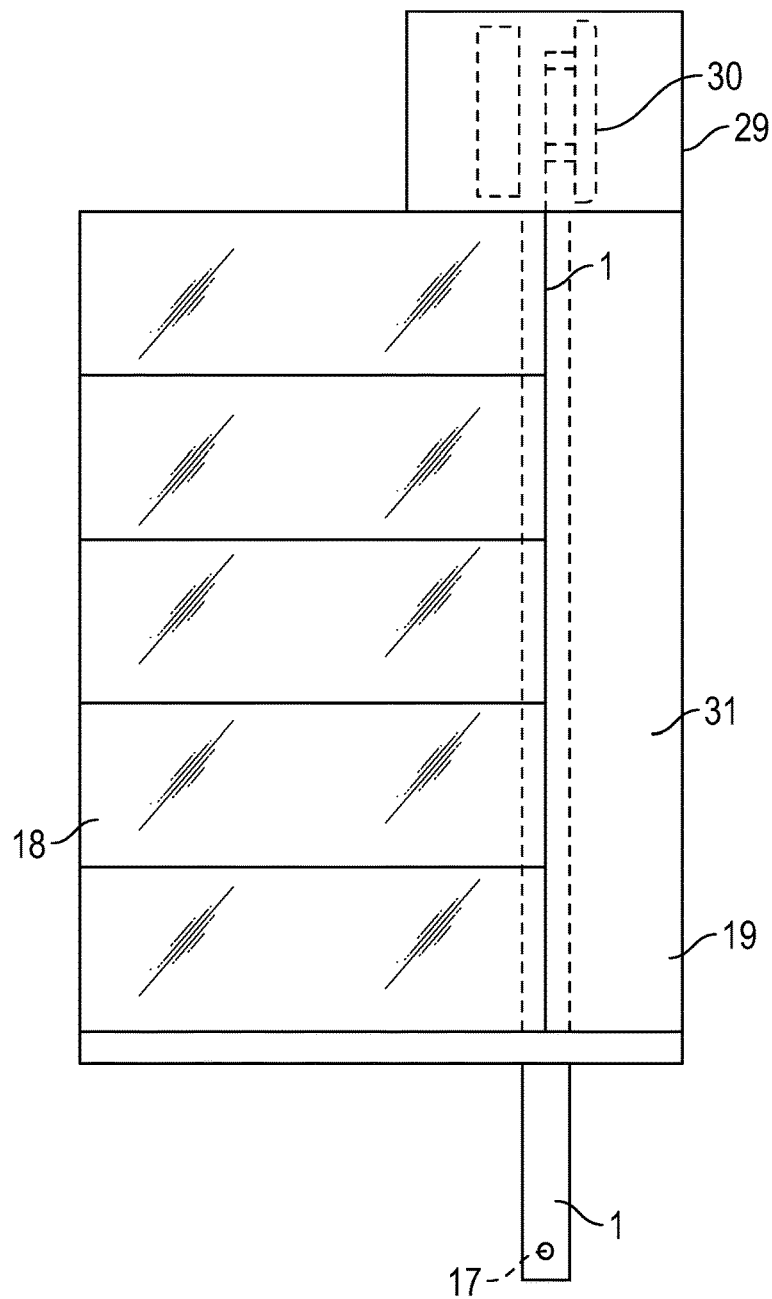
FIG. 10 is a side view of an airfoil structure in the solar tower installation including cellular panels according to an embodiment.

As shown in FIG. 10, marketing marks and images 31 could be incorporated on the airfoil making this attractive for restaurants, gas stations, EV charge stations, cellular carriers and other businesses for advertising or additional revenue generation purposes. The LED light track and solar power cable may be positioned along the side and through the shell.

Figure 11:
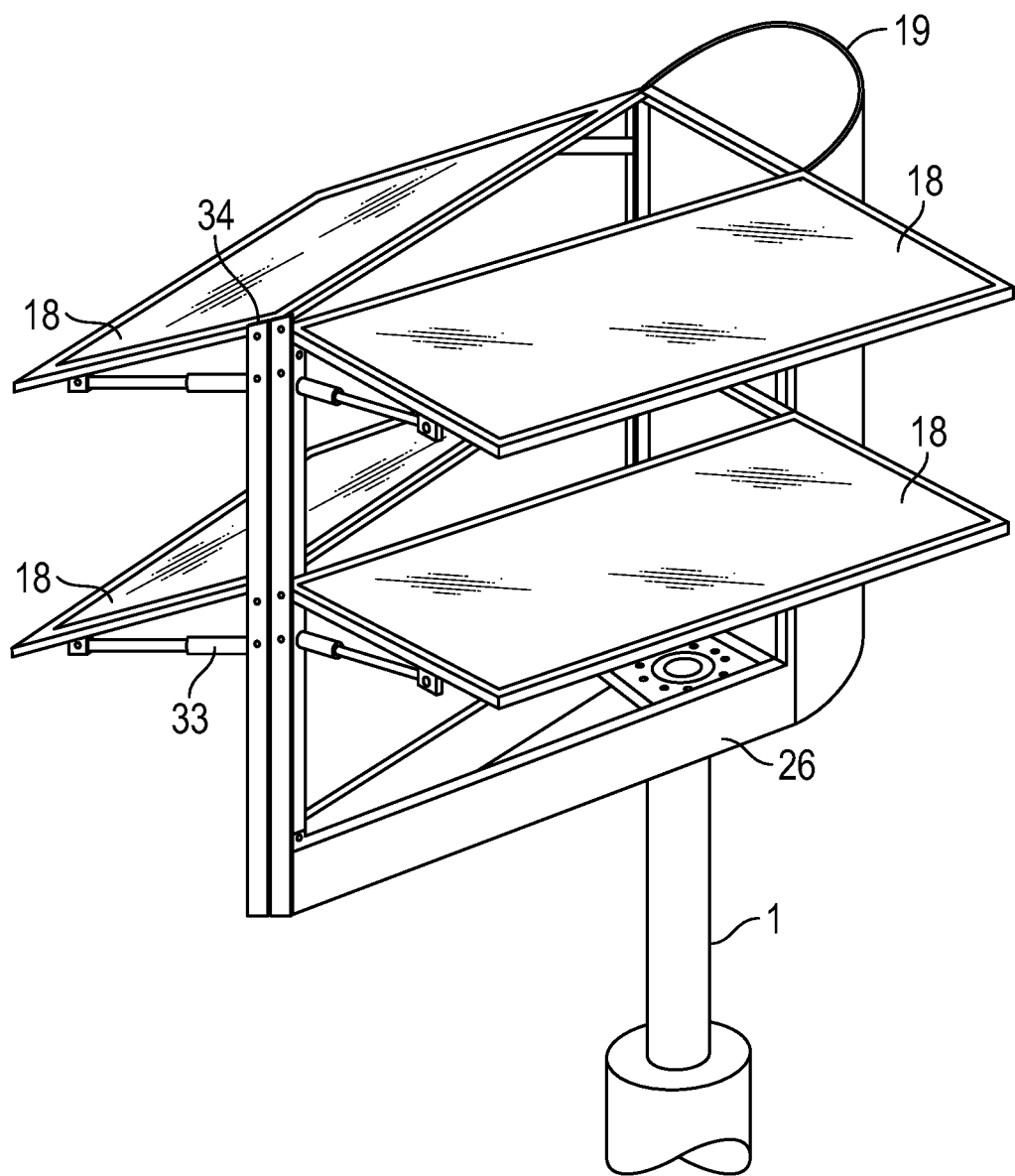
FIG. 11 is a perspective view of a portion of the solar tower installation with solar panels partially extended vertically.

FIG. 10 shows the solar panels in a "closed" position. The solar panels may be rotated horizontally from the closed position by up to 90 degrees in order to improve solar exposure, as shown in FIG. 11. To further increase solar power generation, each solar panel could be installed with hinges 34 and linear actuators 33 to adjust the angle of the solar panel from 90 degrees vertical to the optimal angle with the sun throughout the day. This would provide the solar panels with 2 axes of rotation with the sun: azimuth tilt.

Figure 12:
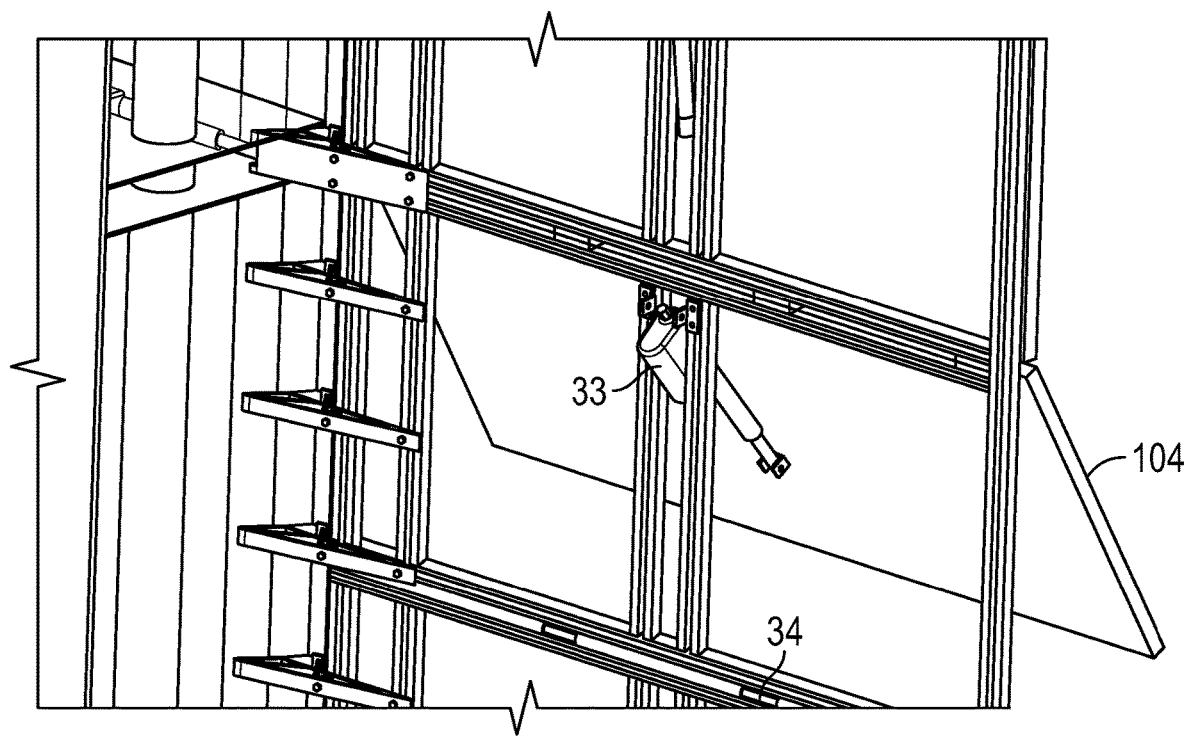
FIG. 12 is another view of a portion of the solar tower installation with solar panels partially extended vertically.

FIG. 12 shows another embodiment of the hinges 34 and linear actuators 33. In an embodiment, the linear actuators 33, and 35 (FIG. 14) may be IP66 rated 24V DC with Hall sensors for accurate positioning. The linear actuators 33, 35 may be connected to load sensors to measure the load on the solar panels 18 and solar frame assemblies 106 due to wind forces. If the load exceeds a certain threshold, the linear actuators may close the solar frames 104 into the airfoil configuration to prevent damage to the solar panels or other components of the tower.

To use this embodiment, one would simply integrate solar panels in the skin of a vertical airfoil capable of rotating freely into the wind. The airfoil shape allows for a large number of solar panels to be installed along the chord length as well as vertically producing a large amount of solar power in a small footprint of land. The efficient airfoil shape allows for a light support structure and foundation, reducing the overall cost per kilowatt hour while providing a lot more options for installing a solar project.

Figure 13:
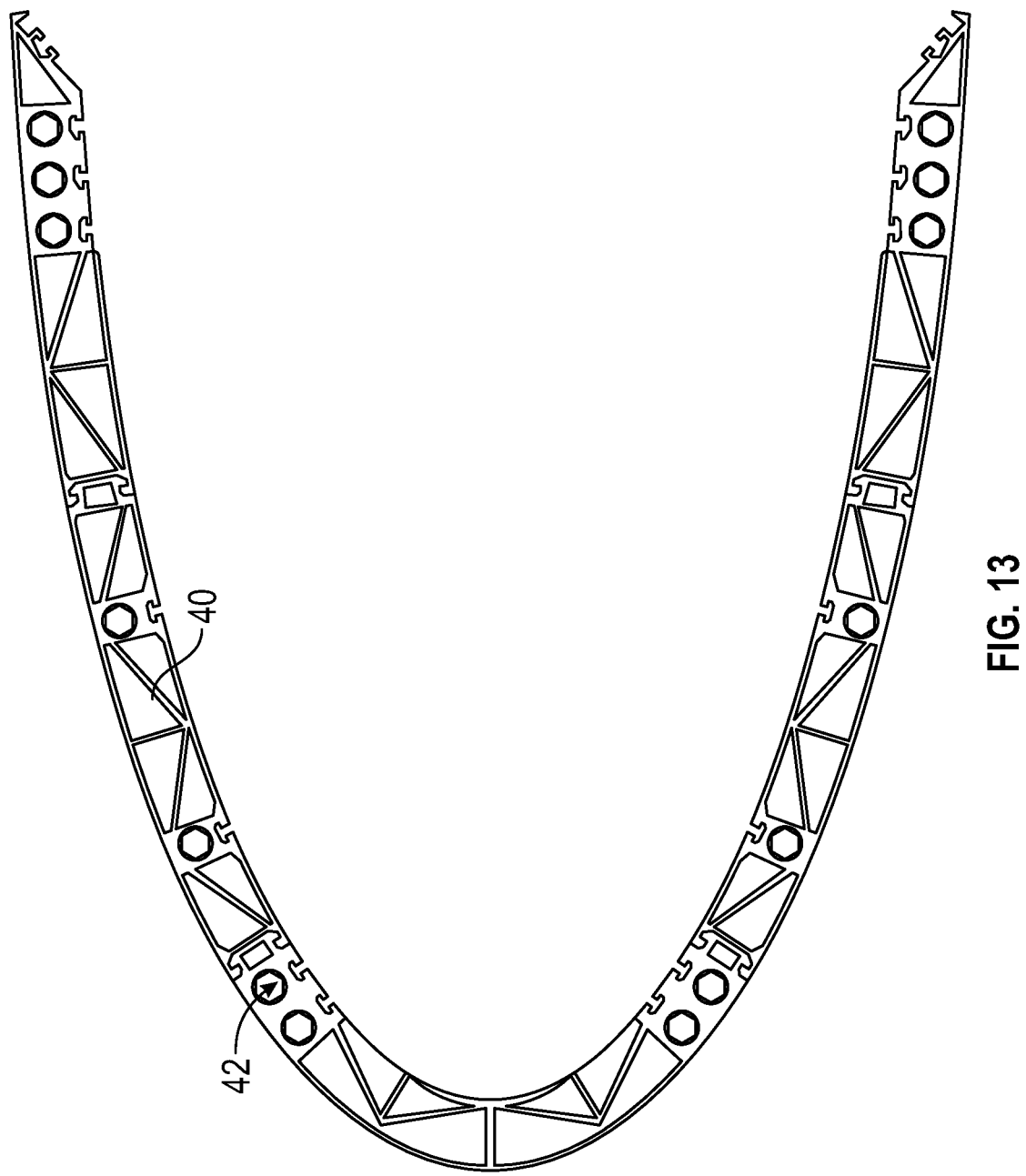
FIG. 13 is a sectional view of the shell of the solar tower installation according to an embodiment.

In an embodiment, the shell material for the nose 102 may have a diamond webbing structure 40, e.g., 55 mm wide by 2 mm thick with 2 mm thick inner and outer shells, to provide stress distribution throughout the shell, as shown in FIG. 13. More bolt holes 42 may be positioned in areas, for example, the nose (e.g., two on each side) and ends of the shell (e.g., three on each side). In another embodiment, the shell material may be fiberglass. Areas of the shell that experience higher stress, for example the front nose, may include additional layers of fiberglass to reinforce those areas. For example, the thickness of the fiberglass may range from ¼ inch thick in less stressed areas to one inch thick in higher stress areas.

Figure 14:
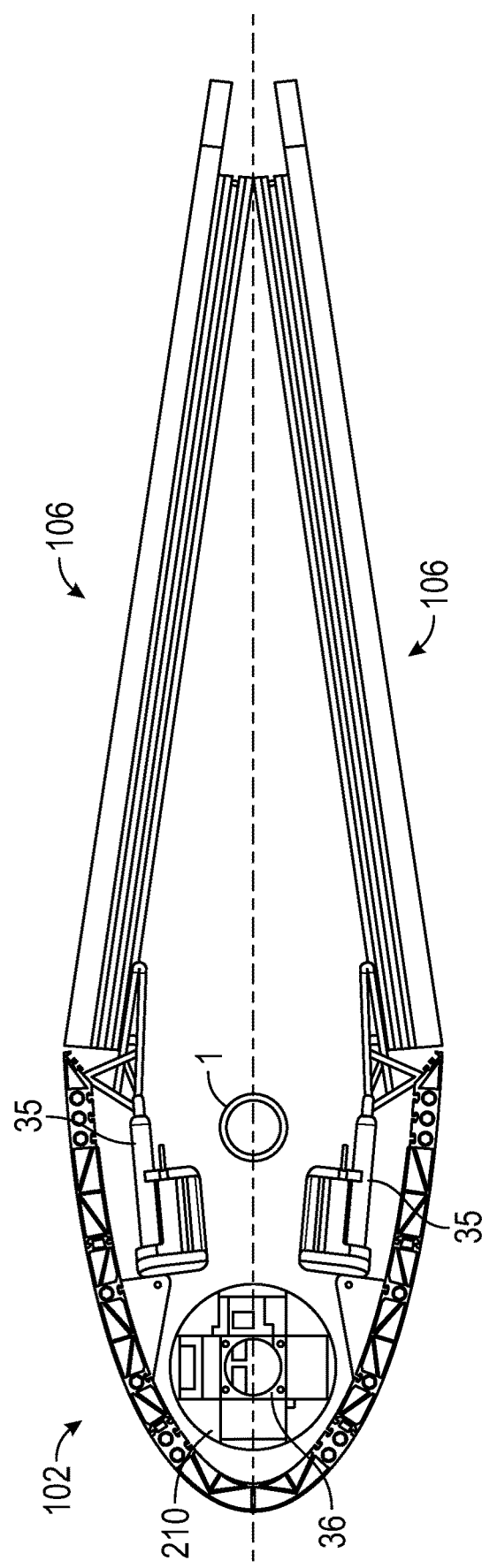
FIG. 14 is a sectional view of an airfoil structure according to an embodiment.
Figure 15:
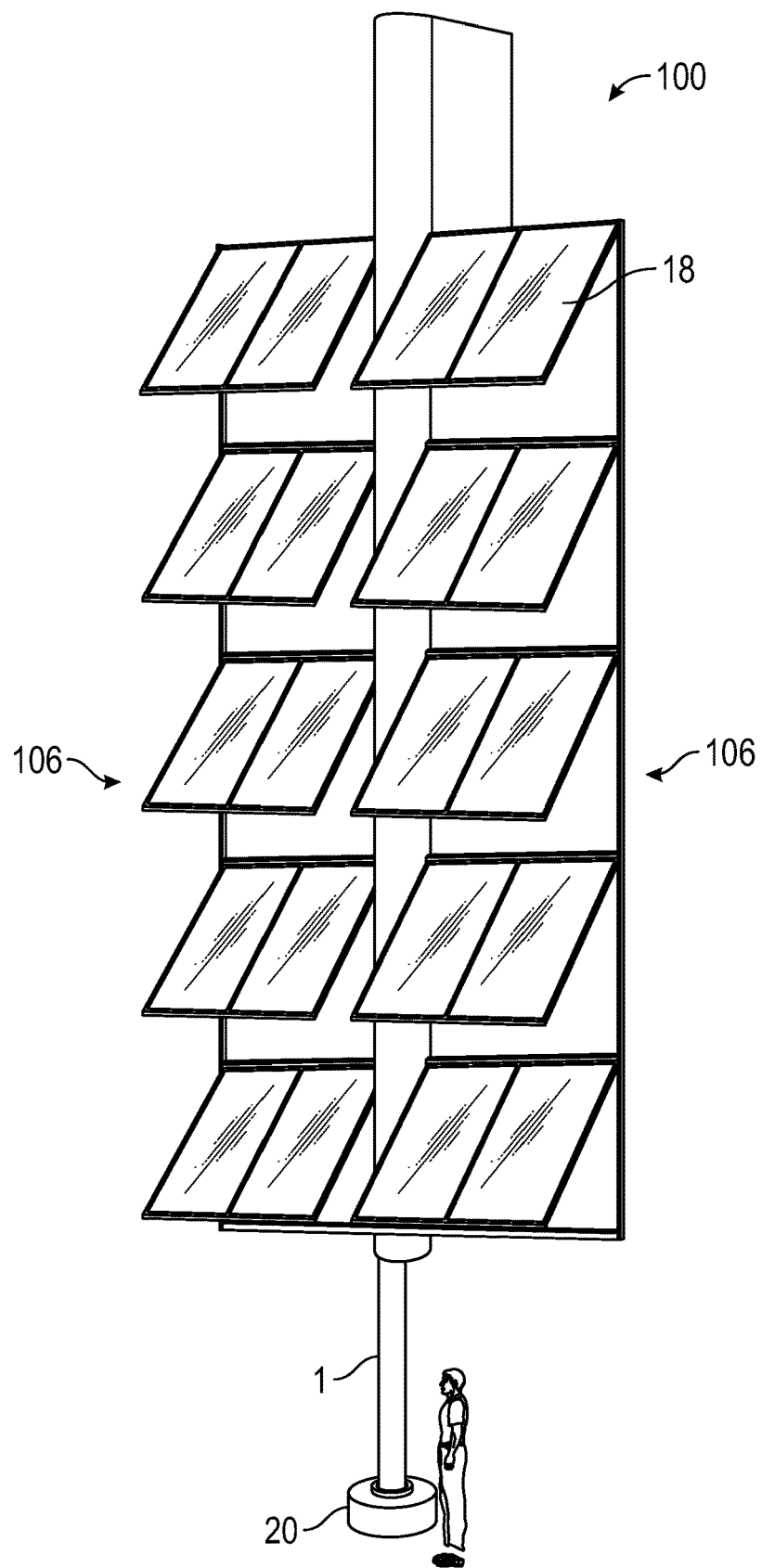
FIG. 15 is a perspective view of a solar tower installation with the solar frame assemblies and solar panels extended.

As shown in FIG. 14, the two solar frame assemblies 106 may be attached on either end of the shell 102. Linear actuators 35 (described above) may be provided between the shell 102 and solar frame assemblies, enabling the solar frame assembles 106 to be extended, as shown in FIG. 15.

Figure 16:
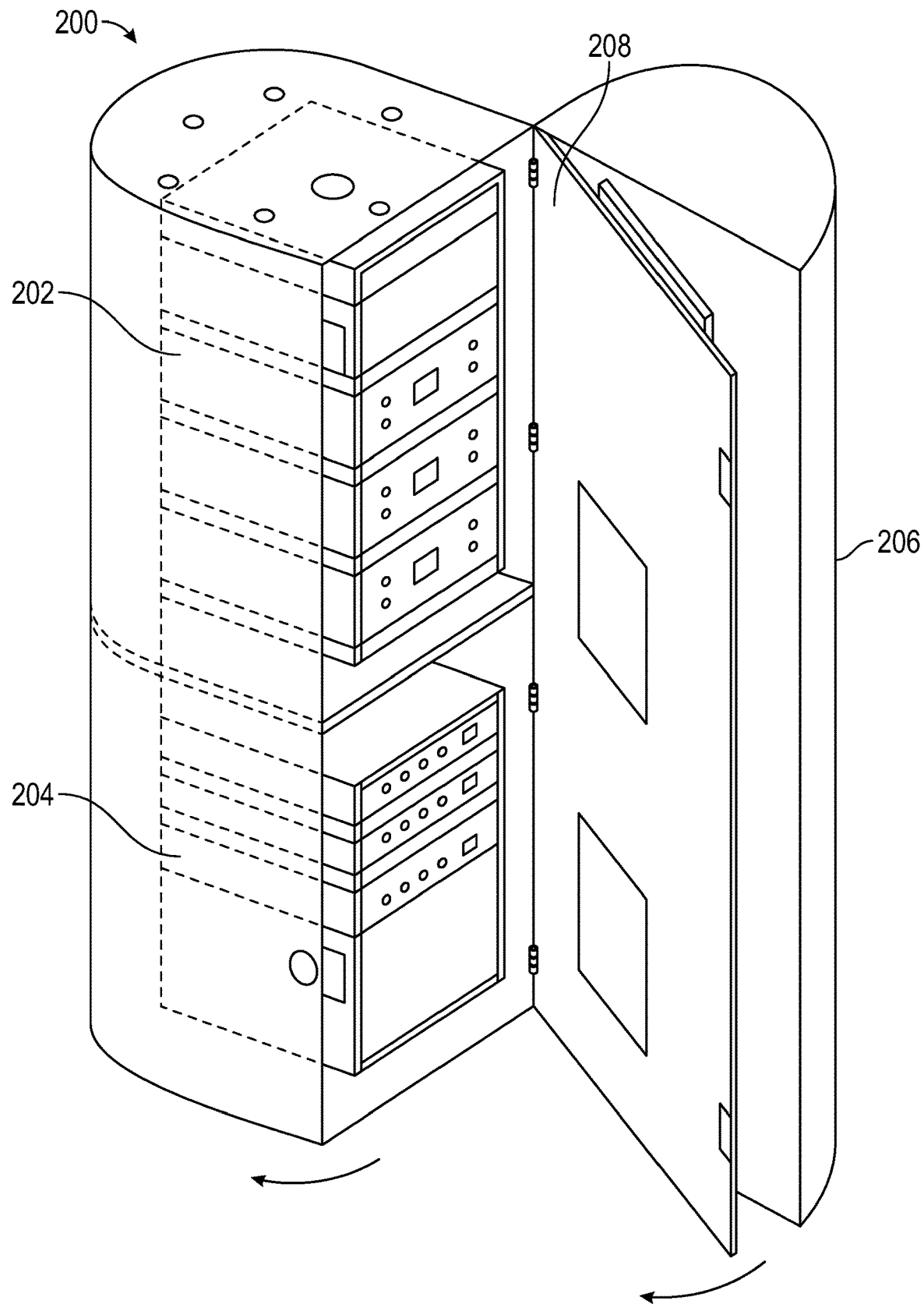
FIG. 16 is a perspective view of a base cabinet of the solar tower installation according to an embodiment.

In an embodiment shown in FIG. 16, a base cabinet 200 to which the airfoil connects and rotates above, may include components such as batteries 202 and cellular equipment and tower monitoring equipment 204. A first door 206 may open to provide access to a ladder for climbing inside the airfoil and one or more LCD monitors for providing information regarding, e.g, battery conditions, wind, power, performance and errors. A second door 208 may be provided to access the batteries.

The base cabinet 200 may be designed to fit a standard 19.5" racking system. The base cabinet may be fully enclosed with grounding, air conditioning, fans, and temperature control.

The batteries 202 may be lithium power racks. The batteries may be, e.g, 2.5 kW, 5 kW, or 10 k stackable battery packs. The batteries may be connected in series or parallel, depending on the application. A battery management system (BMS) control unit may be provided for each lithium power rack to control and monitor, e.g., voltage and cell temperature, power supplied by the system, load control, etc.

Figures 17A, 17B, 17C:
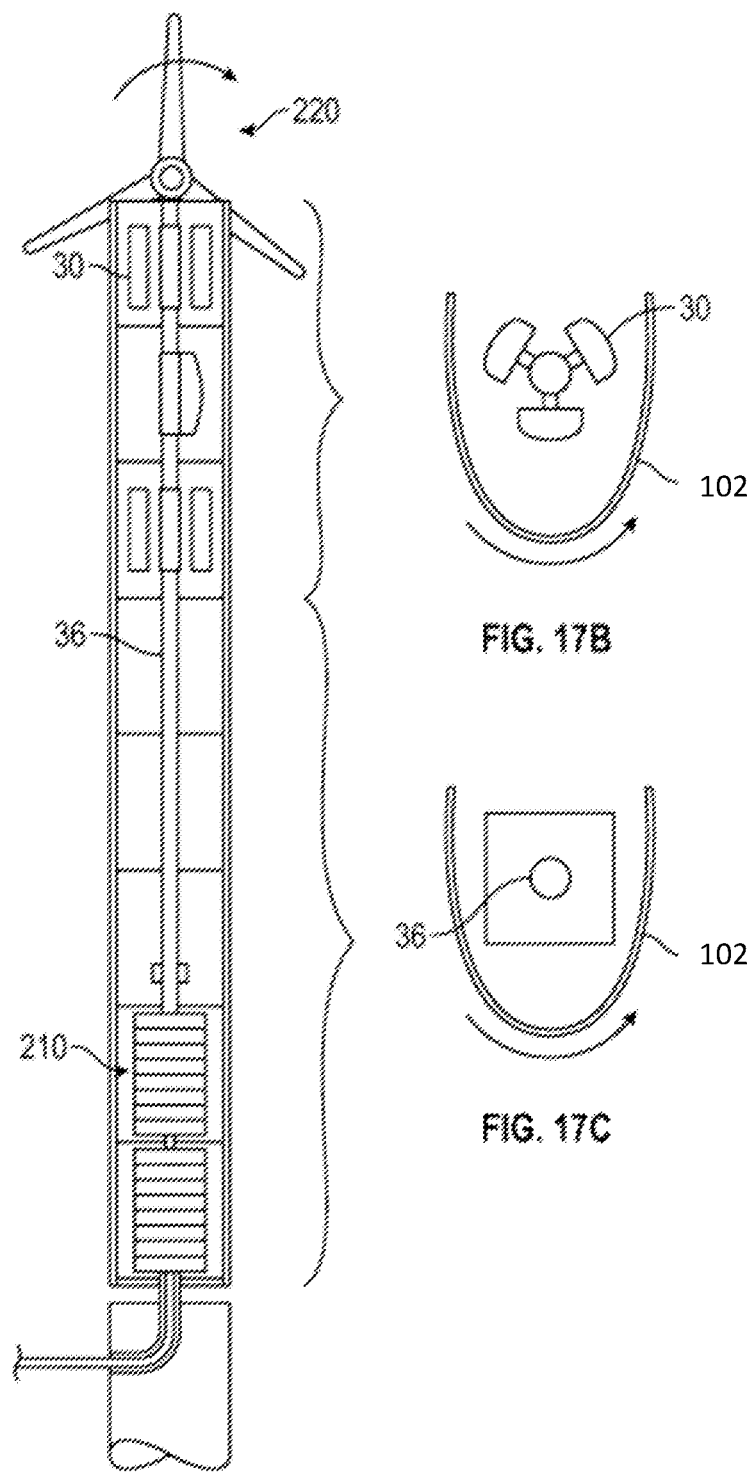
FIGS. 17A-C show components including cellular panels, batteries and wind turbines installed in the solar tower installation according to an embodiment.

As shown in FIG. 17A, round lithium power discs 210 may be placed in the nose 102 for additional space saving (see also FIG. 14). The lithium power discs may be 5 kW 51.2V discs (18"×6"×50 lbs) that can be stacked in parallel or series to increase to a 308V system for 2-way electrical vehicle charging. In this manner, the tower 100 can be used to charge an electrical vehicle when the batteries have sufficient charge, and the batteries in the electrical vehicle may be used to charge the batteries in the tower if the tower batteries run low.

FIGS. 17B and 17C show how the nose can rotate around components in the tower connected around the non-rotating spline 36.

Figure 18:
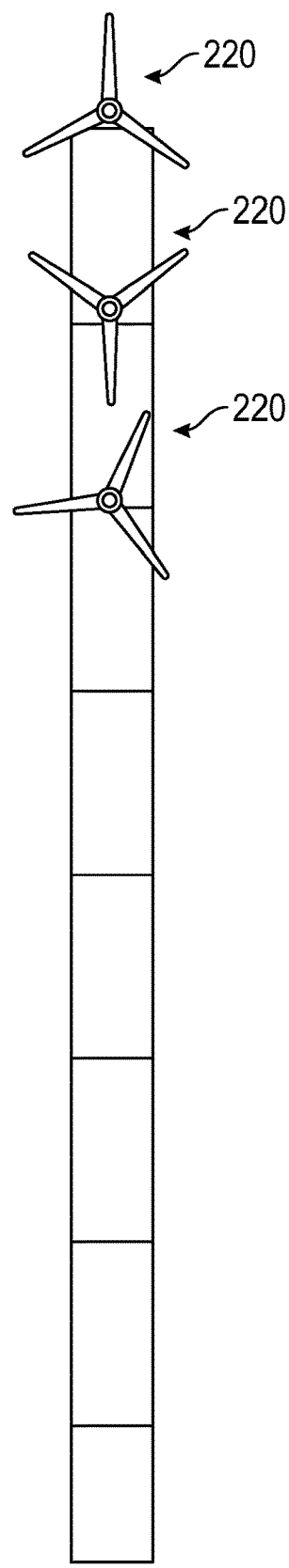
FIG. 18 is a front view of a solar tower installation including multiple horizontal axis wind turbines incorporated into the tower according to an embodiment.

In an embodiment shown in FIG. 18, stacked horizontal axis wind turbines 220 may be attached to the shell above the solar panel section of the tower with a bearing to allow the turbine section to rotate independently of the solar section. Motors for the wind turbines may be provided within the shell.

Figure 19A:
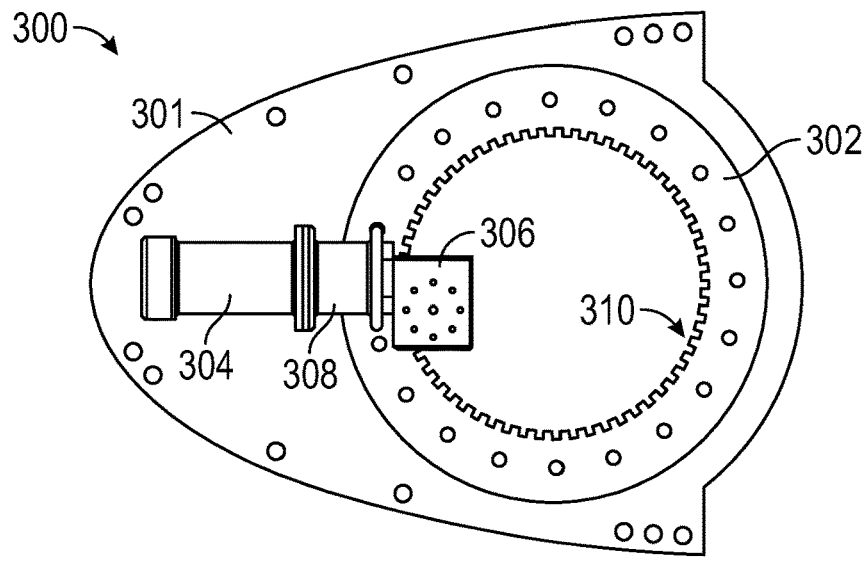
FIG. 19A-C show various views of a base gear design including a slewing bearing assembly for the solar tower installation according to an embodiment.
Figure 19B:
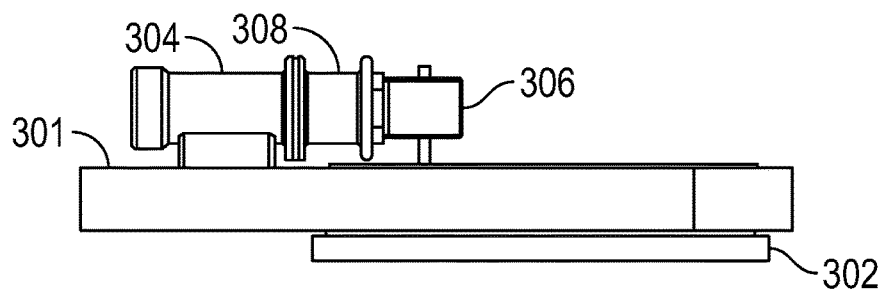
Figure 19C:
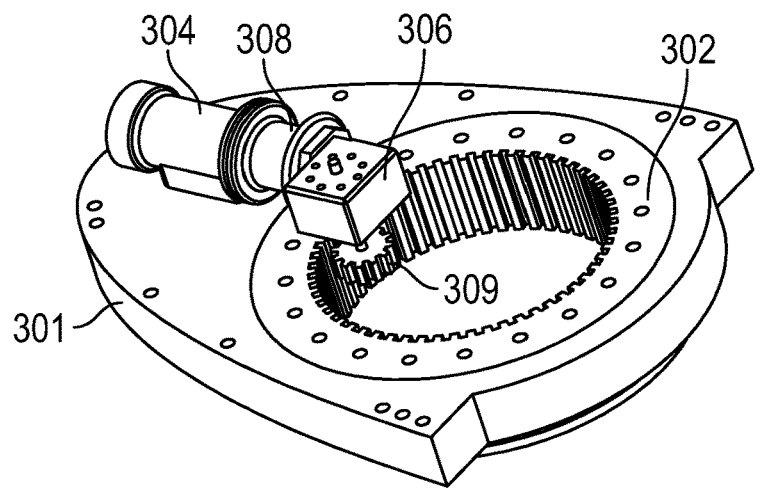

FIGS. 19A to 19C show different views of a base design including a slewing bearing assembly 300 for the tower 100. The extruded aluminum or fiberglass shell bolts to a forged outer bearing 301. Inner bearing 302 is bolted to the concrete foundation. A motor 304 drives a gear reducer 306 through an electromagnetic clutch and break unit 308 at a desired gearing ratio between the pinion 309 on the reducer 306 and the teeth 310 on the inner diameter of the inner bearing 302. This allows the structure to rotate 360 degrees and brake in an appropriate position based on predicted and/or measured weather conditions. In high wind conditions, the clutch may be released, allowing the airfoil structure to rotate freely.

Figure 20:
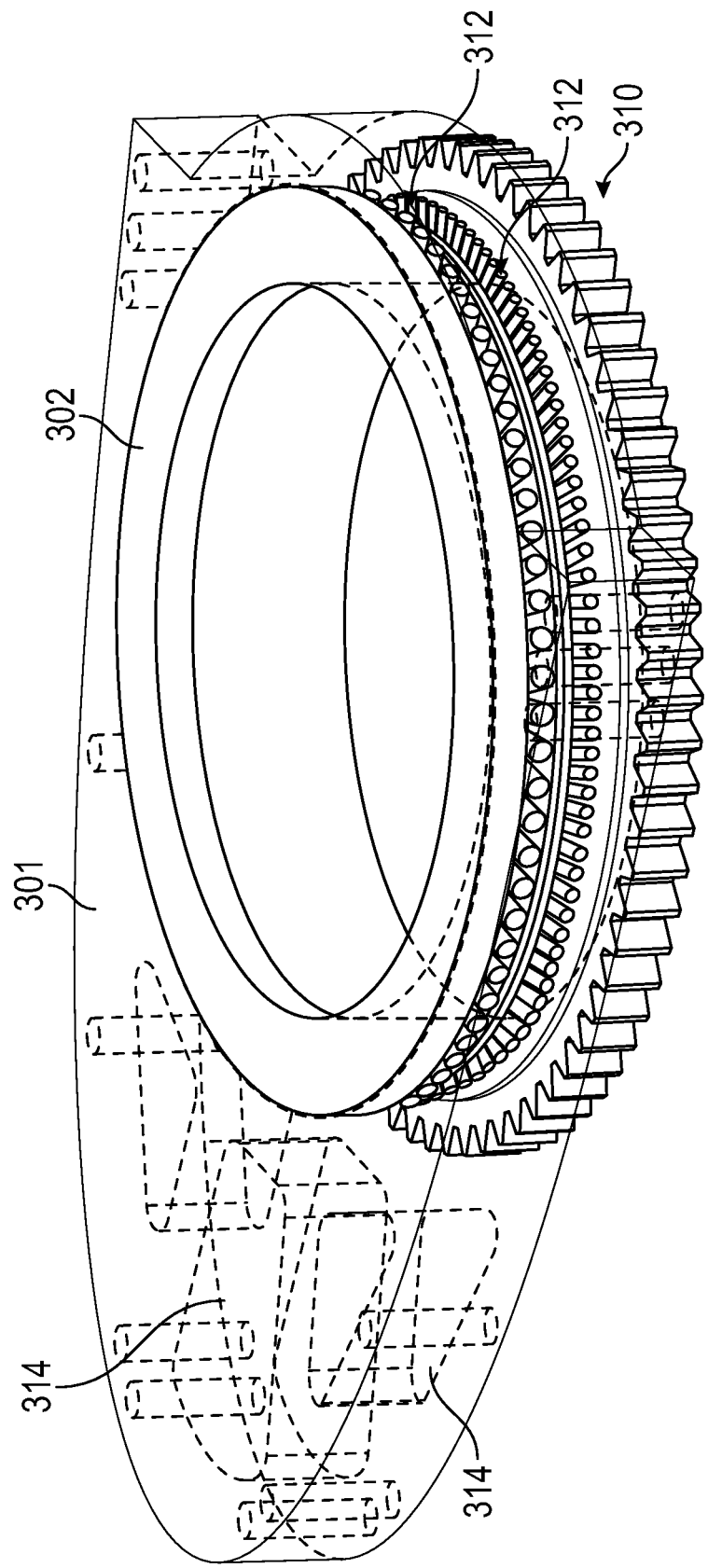
FIG. 20 shows a base design for the solar tower installation according to another embodiment.

FIG. 20 shows another embodiment with gear teeth 310 on the outer diameter of the inner bearing 302 and the internal bearings 312 in the bearing. Portions 314 may be cut out of the forged outer bearing 301 to reduce weight.

Figure 21:
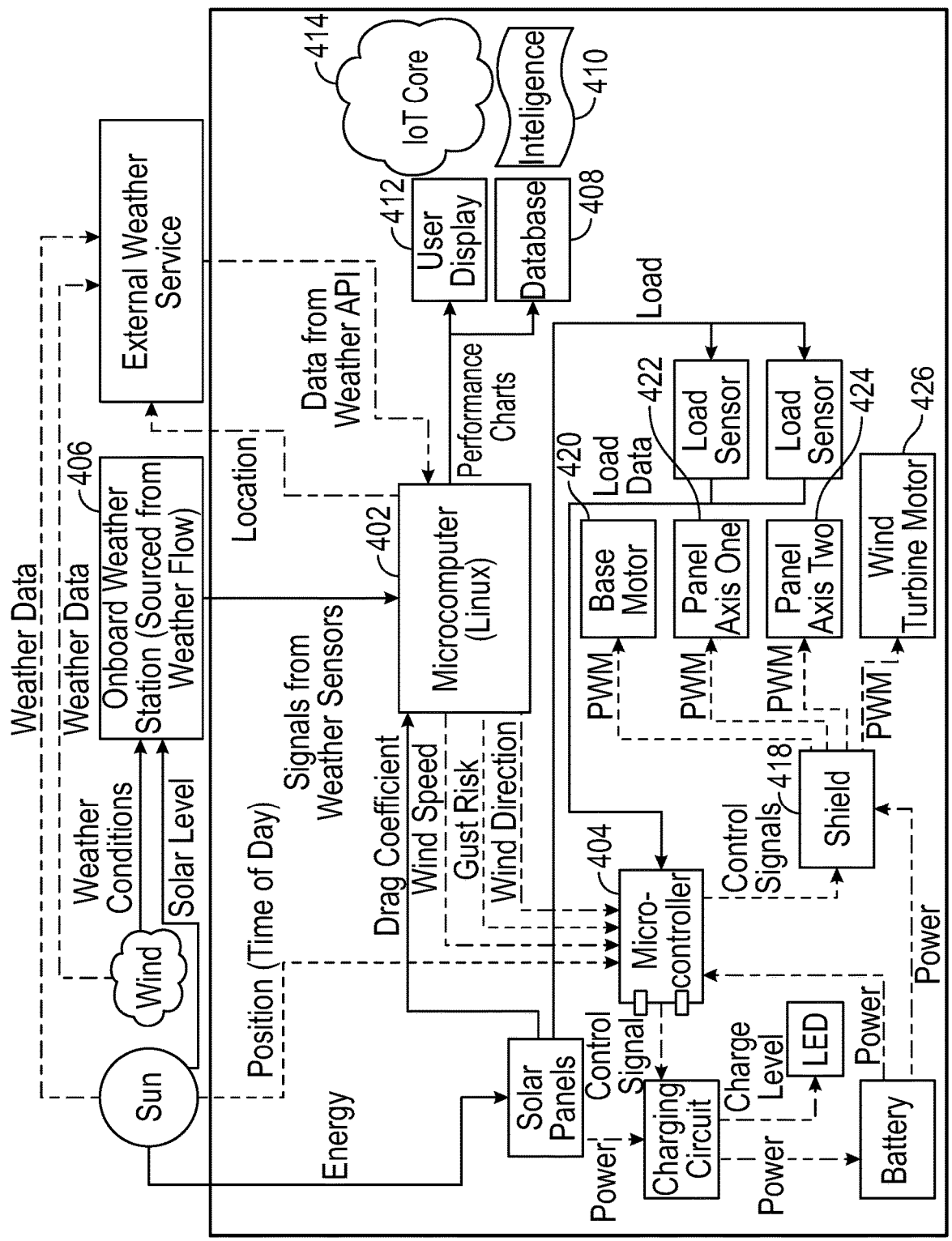
FIG. 21 is a schematic of a control unit for the solar tower installation according to an embodiment.

The airfoil solar tower structure may be controlled by a control unit. FIG. 21 is a schematic of the control unit, which may include a microcomputer 402 and microcontroller 404, and how the control unit interacts with other components of the system. The tower 100 may include an all-in-one weather monitoring system 406 to obtain wind speed and direction, ambient light, ultraviolet index, solar radiation, temperature and humidity, and a lightning sensor (strikes & distance). This information can be provided to the microcomputer 402, as well as be used to safely operate and climb the tower. An example of such a weather monitoring system is provided by the company WeatherFlow. This device also links with an external weather service, such as the National Oceanic and Atmospheric Administration (NOAA), which provides its own forecast models. The microcomputer 402 can use this information along with past climate and power usage information in a database 408 and internal intelligence 410 to provide predictive analysis of future power production versus usage, and provide notifications if power is anticipated to be limited. A user may access this and other information through a user display and interface 412, or remotely through cloud computing web service/Internet of things (IoT) module 414.

Based on current and predictive solar and weather conditions, the microcomputer 402 can send signals to microcontroller 404 to move and orient the solar panels and wind turbine to respective positions in order to take advantage of the solar and weather conditions. The microcontroller 404 may send control signals through a shield 418, to control each motors "throttle" and direction to a base motor 420, panel axis 1 motor 422, panel axis 2 motor 424, and wind turbine motor 426. The base motor 420 may rotate the entire structure 360 degrees to an appropriate position. The panel axis 1 motor 422 may control the degree of tilt of the solar panels. The panel axis 2 motor 424 may control the opening of the solar frame assemblies from ends of the shell 102 from a closed, airfoil configuration, as shown in FIG. 14, to an open position, as shown in FIG. 15. The wind turbine motor 426 may rotate the wind turbine into the wind.

Load data may also be provided to the microcontroller 404 from the load sensors on the linear actuators for the solar panels and solar frame assemblies. Based on this load information, the microcontroller 404 may close the solar panels and solar frame assemblies into the airfoil configuration, and may release the clutch to enable the structure to freely rotate.

In an alternative embodiment, the airfoil solar tower structure could also be incorporated into the design of a fixed wing sail for sailboats. To keep the structure lightweight, the skin would be made with flexible solar panels with an internal flexible frame such as carbon, allowing the windward face to flex inward, improving lift. A bearing would still be incorporated into the mast with an azimuth adjustment motor to control the angle of the fixed wing in relation to the wind.

The foregoing method descriptions and diagrams/figures are provided merely as illustrative examples and are not intended to require or imply that the operations of various aspects must be performed in the order presented. As will be appreciated by one of skill in the art, the order of operations in the aspects described herein may be performed in any order. Words such as "thereafter," "then," "next," etc. are not intended to limit the order of the operations; such words are used to guide the reader through the description of the methods and systems described herein. Further, any reference to claim elements in the singular, for example, using the articles "a," "an," or "the" is not to be construed as limiting the element to the singular.

Various illustrative logical blocks, modules, components, circuits, and algorithm operations described in connection with the aspects described herein may be implemented as electronic hardware, computer software, or combinations of both. To clearly illustrate this interchangeability of hardware and software, various illustrative components, blocks, modules, circuits, operations, etc. have been described herein generally in terms of their functionality. Whether such functionality is implemented as hardware or software depends upon the particular application and design constraints imposed on the overall system. One of skill in the art may implement the described functionality in varying ways for each particular application, but such implementation decisions should not be interpreted as causing a departure from the scope of the claims.

The hardware used to implement various illustrative logics, logical blocks, modules, components, circuits, etc. described in connection with the aspects described herein may be implemented or performed with a general purpose processor, a digital signal processor ("DSP"), an application specific integrated circuit ("ASIC"), a field programmable gate array ("FPGA") or other programmable logic device, discrete gate logic, transistor logic, discrete hardware components, or any combination thereof designed to perform the functions described herein. A general-purpose processor may be a microprocessor, a controller, a microcontroller, a state machine, etc. A processor may also be implemented as a combination of receiver smart objects, e.g., a combination of a DSP and a microprocessor, a plurality of microprocessors, one or more microprocessors in conjunction with a DSP core, or any other such like configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions (or code) on a non-transitory computer-readable storage medium or a non-transitory processor-readable storage medium. The operations of a method or algorithm disclosed herein may be embodied in a processor-executable software module or as processor-executable instructions, both of which may reside on a non-transitory computer-readable or processor-readable storage medium. Non-transitory computer-readable or processor-readable storage media may be any storage media that may be accessed by a computer or a processor (e.g., RAM, flash memory, etc.). By way of example but not limitation, such non-transitory computer-readable or processor-readable storage media may include RAM, ROM, EEPROM, NAND FLASH, NOR FLASH, M-RAM, P-RAM, R-RAM, CD-ROM, DVD, magnetic disk storage, magnetic storage smart objects, or any other medium that may be used to store program code in the form of instructions or data structures and that may be accessed by a computer. Disk as used herein may refer to magnetic or non-magnetic storage operable to store instructions or code. Disc refers to any optical disc operable to store instructions or code. Combinations of any of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

The invention claimed is:

1. A solar tower installation comprising:
    a tower structure;
    a vertical support tube extending through and connected to the tower structure;
    a base for receiving the bottom end of the vertical support tube; and
    a bearing assembly at the base connected to the vertical support tube, and operable to enable the tower to rotate about the base;
    two solar frame assemblies, each solar frame assembly including
        a plurality of vertically stacked modular solar frames, each solar frame including a panel frame, a solar panel, and an actuator connected between the panel frame and the solar panel, and a load sensor connected to the actuator, wherein the actuator is operative to move the solar panel between a vertical closed position and a non-vertical extended position;
    a curved nose portion comprising a plurality of vertically stacked front covers, each front cover including a first end connected to a solar frame in a first one of the two solar frame assemblies and a second end connected to a corresponding solar frame in a second one of the solar frame assemblies; and a plurality of actuators connected between the solar frame assemblies and the curved nose portion to extend the solar frame assemblies horizontally and close the solar frame assemblies into an airfoil configuration;

a control system;

a sensor system for determining wind and solar conditions;

a motor connected to the base of the vertical support tube;

a clutch connected to the bearing; and a non-transitory memory containing instructions when executed by the control system causes the control system to perform the steps of:

monitor information from the load sensor connected to the actuator in each of the solar frames; and in response to determining that at least one of the load sensors indicate a load exceeding a load threshold, initiating an airfoil operation including controlling the actuator in each solar frame to move the solar frame into the vertical closed position, control the actuators connected between the solar frames and curved nose portion into the airfoil configuration, and disengage the clutch to enable the tower structure in the airfoil configuration to move freely, and wherein the control system is operative to control the clutch to disengage and re-engage and to control the motor to rotate the vertical support tube in response to wind and solar conditions.

2. The solar tower installation of claim 1, wherein the control system is further operative to control the actuators connected between the panel frame and the solar panel in each solar frame and the plurality of actuators connected between the solar frame assemblies and the curved nose portion in response to solar conditions.

3. The solar tower installation of claim 1, further comprising a modem for receiving wireless signals from an external weather service.

4. The solar tower installation of claim 1, wherein the sensor system provides the information indicative of wind conditions.

5. The solar tower installation of claim 1, wherein the base bearing assembly is operative to enable the structure to rotate 360 degrees, and wherein the curved nose portion comprises a main structural support for the tower structure and is fixed to the base bearing assembly.

6. The solar tower of claim 5, wherein the tower structure includes a non-rotating spline adapted to receive accessories installed in the tower structure.

7. The solar tower of claim 6, wherein the solar frame assemblies are operative to open to allow access to climbing the tower structure and to access to installed accessories for servicing.

8. The solar tower of claim 7, further comprising:

a plurality of batteries for receiving and storing energy provided by the solar panels and operating accessories installed in the tower structure.

9. The solar tower of claim 8, further comprising:

a light strip vertically integrated within the tower structure to indicate performance metrics including at least one of a battery state of charge, solar power generation, and wind power generation.

10. The solar tower installation of claim 1, further comprising a wind turbine assembly.

11. The solar tower installation of claim 10, wherein the wind turbine assembly is incorporated into the tower structure.

12. The solar tower installation of claim 10, wherein the wind turbine assembly is mounted above the solar frame assembly on an independent bearing allowing the upper wind turbine assembly to rotate into the wind while the solar frame assembly continues to track the sun.

13. The solar tower of claim 10, wherein the solar frame assemblies are operative to open to allow access to climbing the tower structure and access the wind turbine assembly for servicing.

14. The solar tower installation of claim 1, wherein the curved nose portion has an elliptical shape.

15. The solar tower installation of claim 14, wherein when the bearing assembly and the the airfoil structure enables the tower to rotate around the base in response to the direction of incoming wind and move the elliptically shaped curved noise portion into the direction of the incoming wind.

16. The solar tower installation of claim 1, wherein the extended position is up to 90 degrees from the vertical closed position and selected based on solar conditions.

17. The solar tower installation of claim 1, wherein each solar frame includes top and bottom solar panel receiving channels and a plurality of vertical braces connected between the top and bottom channels, and wherein the top channel includes a hinge operative in conjunction with the actuator to enable the solar panel to tilt from the vertical closed position.

\* \* \* \* \*